United States Patent Office 3,159,066
Patented Dec. 1, 1964

3,159,066
CONTROL APPARATUS FOR CUT-OFFS
Russell W. McDaniels, Chesterfield, N.J., assignor to Koppers Company, Inc., Pittsburgh, Pa., a corporation of Delaware
Filed July 16, 1959, Ser. No. 827,487
8 Claims. (Cl. 83—76)

The invention relates to machinery of the type used in cutting corrugated paperboard into blanks of selected lengths as the material is continuously fed to continuously rotating cut-off knives. Cut-offs of the above character have long been known and used in which the length of cut is varied by adjusting a variable speed transmission such as the Reeves drive, which is interposed in the driving train leading to the cut-off knives and adjusted to rotate the latter at a faster or slower rate as needed to produce shorter or longer blanks. To avoid injury to the material or the machine, the cutters when engaging the material should travel substantially in the same direction and substantially at the same speed as the material being cut, throughout the entire range of length of cut. Adjusting the machine to different lengths of cut will cause the above mentioned speed of travel of the cutter (hereinafter called "cutting" or "operating" speed) to be thrown out of equality with the speed of feed of the material, unless the machine is provided with special motion compensating features. In cut-offs of the above character, adjustable crank mechanism or other mechanisms capable of causing the cutting knives to move at different speeds in different phases of their cycle, have been used to regulate the cutting speed, being interposed in the cutter driving train between the output of the variable speed transmission and the cutters, and being adjusted to keep the cutting speed at all times substantially equal to the speed of feed of the material being cut, despite adjustments of the cut-off to different lengths of cut. The above arrangements have enabled the length of cut and the cutting speed to be concurrently regulated while the machine was running. The U.S. Reissue Patent No. 19,989, issued May 26, 1936, to George W. Swift, Jr., and the U.S. Patent No. 2,316,221, issued to H. W. Bruker and F. W. Overton on April 13, 943, may be referred to as illustrative of machinery of the above discussed type.

In one of its aspects, the invention aims to provide a satisfactory "pre-set" mechanism so coordinated with the machine proper that while the latter is producing a run of blanks of one selected length, the pre-set mechanism may be set to cause the machine to be shifted to a different selected length of cut upon completion of the run during which the "pre-set" adjustment is made. Preferably in carrying out this phase of the invention an adjustable master cam is employed which is disconnected from the length adjusting mechanism while being adjusted to a new setting during the current run of blanks, but is thrown into action at the conclusion of such run to shift over the machine to the new length of cut desired for the next run, said master cam being used along with a slave cam which had been previously set to determine the length of cut for the current run, and which is shifted at the conclusion of such run to conform to the length of cut desired for the next run as determined by the position to which the master cam was set as above described. The cutting speed adjustments are so coordinated with the adjustments for length of cut as to keep the cutting speed at all times substantially equal to the speed of feed of the material, in other words whenever the length of cut is altered, a compensating adjustment in cutting speed is made.

In another aspect the invention is concerned with the more accurate and precise regulation of the length of cut while a run of blanks desired to be identical in length, is in progress. In machinery of the above character as heretofore known and used, deviations in the speed of feed of the material to the cut-off knives not infrequently have produced objectionable variations in the length of the cut blanks. In accordance with the present invention, although the input driving speed of the variable speed transmission is coordinated as heretofore with the driving speed of the parts which feed the material to the cut-off, the output speed of the variable speed transmission (which determines the length of cut) is also subjected to regulation by parts which derive their speed directly from the material being fed to the cut-off. Thus deviations in the actual speed of feed of the material, as compared to the speed of the driving parts which move both the material and the cutters, will produce correctional adjustments in the output speed of the variable speed transmission, to the end that the length of cut be held substantially constant during a run notwithstanding deviations in the actual speed of feed of the material during such run, as compared to the speed at which the variable speed transmission and the material feeding parts are driven.

Further objects and advantages of the invention will be in part obvious and in part specifically referred to in the description hereinafter contained which taken in conjunction with the accompanying drawings discloses a preferred form of mechanism constructed to operate in accordance with the invention; the disclosure however should be considered as merely illustrative of the invention in its broader aspects. In the drawings:

FIG. 2 is a central vertical section taken through a housing which carries the main working parts of the "pre-set" mechanism previously referred to.

FIG. 3 is an elevation showing one face of the above mentioned housing arranged to serve as an operating panel board in making the adjustments above referred to.

Figures 1, 5, 6:
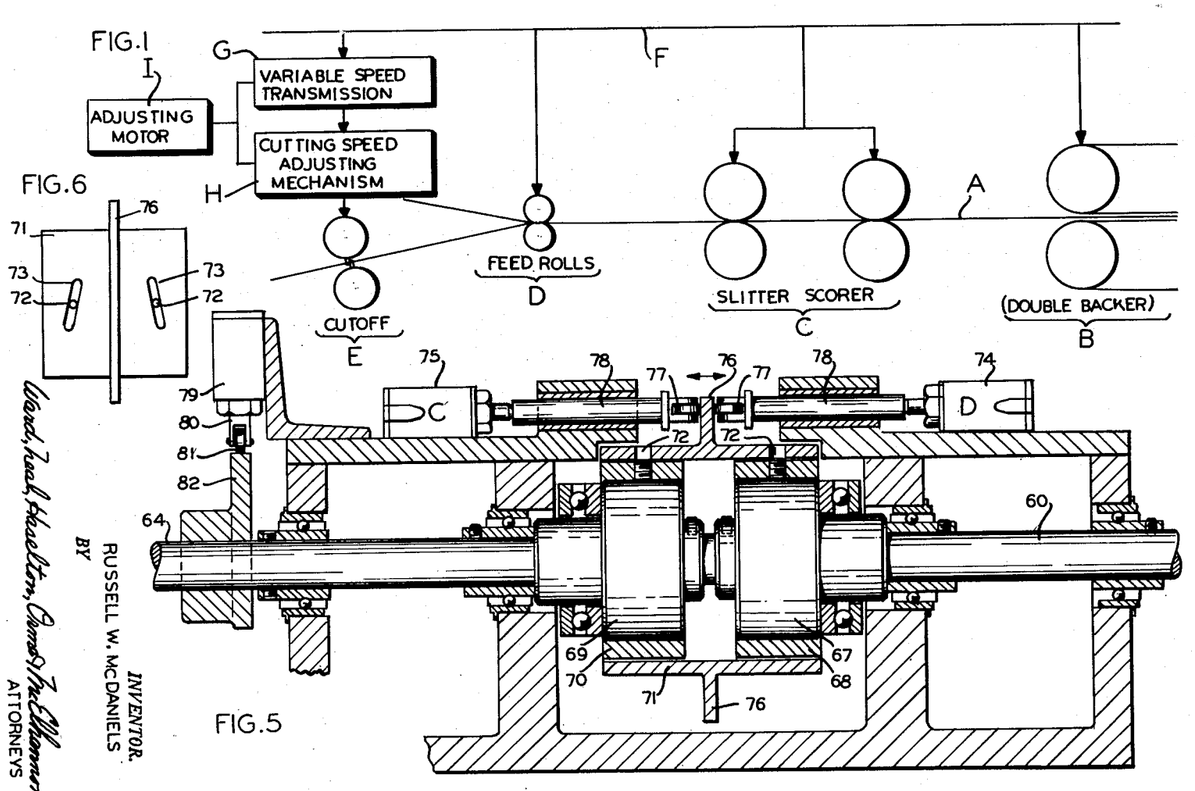
FIG. 1 is a schematic layout showing a cutoff of the type previously referred to, in relationship to the machinery which completes the corrugated paperboard and feeds it to the cutoff in condition to be severed into blanks of selected length by the latter.
FIG. 5 is a longitudinal sectional view taken through a preferred form of apparatus for regulating the length of cut during a run.
FIG. 6 is a detail view showing detached, certain parts used in the mechanism of FIG. 5.

FIG. 1 shows schematically a web A of corrugated paperboard which is continuously fed forwardly from the delivery end of a double-backer B, to pass through a slitter-scorer C which (among other things) slits the traveling web into strips of desired widths. The slit web then passes through a pair of feed rolls D after which the traveling strips are slightly bent respectively upwardly and downwardly to pass through cut-offs which sever them into blanks of desired lengths. Only one of such cut-offs E is shown in FIG. 1, and at F is shown schematically a common drive which may be understood as actuating the above mentioned machines in timed relation. At the left of FIG. 1 a variable speed transmission G and a "cutting speed" adjusting mechanism H are shown as interposed in series between the drive F and cut-off E, a motor I being provided for adjusting the variable speed transmission to different desired lengths of cut, and coordinately adjusting the mechanism H to maintain a cutting speed approximately equal to the speed of travel of the web in all settings of the variable speed transmission G. The above mentioned machines may be understood as being in general of construction and mode of operation as known in the art, and while the invention is disclosed as applied to the manufacture of corrugated paperboard blanks, it is applicable in principle to other machinery wherein a periodically operating cutting or impressing tool or the like, is to be so coordinated with continuously advancing material that the distance between successive operations of the tool—as measured along the length of the traveling material, may be precisely adjusted or regulated as above mentioned.

Figure 2:
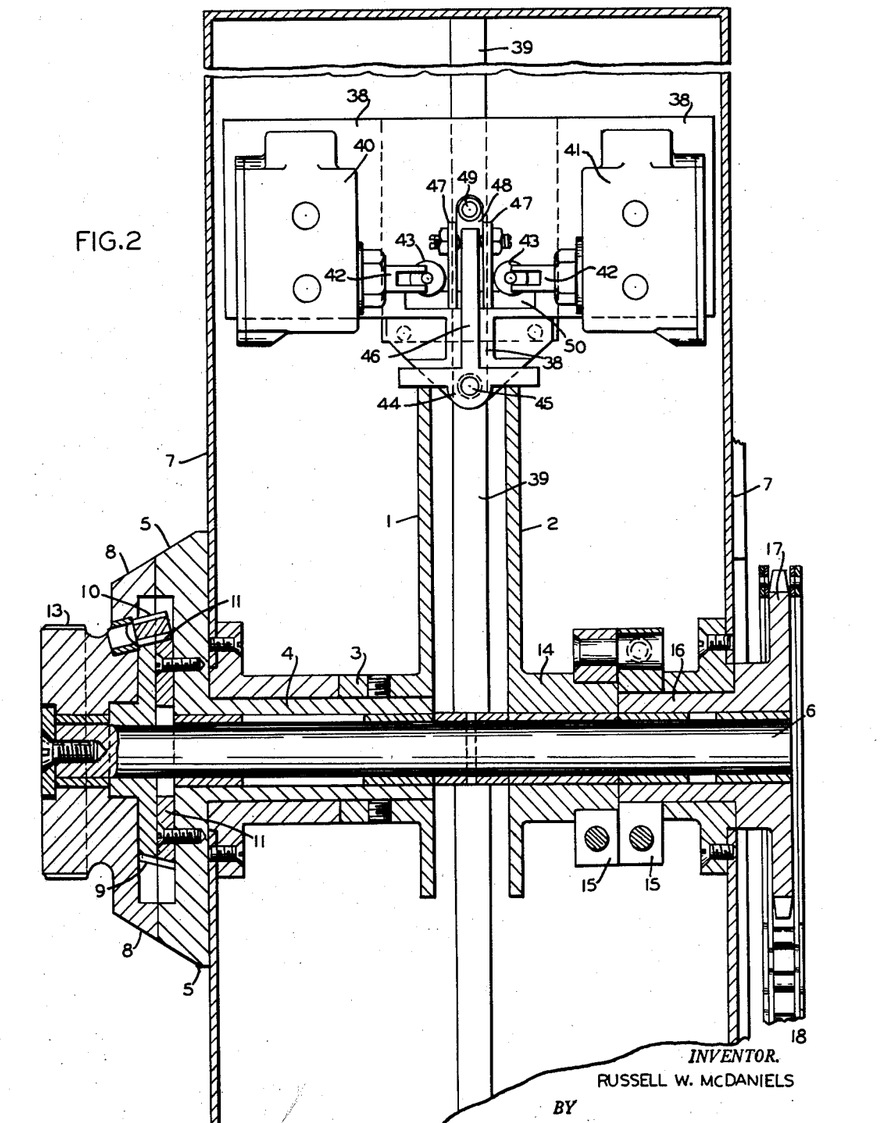

Turning now to the "pre-set" mechanism, the preferred form shown in FIG. 2 comprises a master cam 1 having a contour which ultimately controls the length of cut for which the machine is to be set, according to the effective radius of the cam in different angular positions thereof. A similarly contoured slave cam 2 is provided, the coordination of the cams being such that while a run of blanks of given length is in progress, the master cam 1 is disconnected from the remainder of the mechanism which determines the length of cut, so that while the above mentioned run is in progress, the cam 1 may be turned to the angular position required to produce shorter or longer blanks as needed for the next succeeding run. In other words the parts are so coordinated that prior to the beginning of a run of specified length of blank, the cam 1 will have been set at the angular position needed to produce such length of blank, and the adjusting mechanism for length of cut will have moved the slave cam 2 to an angular position corresponding to cam 1; thereupon the cam 1 is disconnected from the adjusting mechanism for length of cut, leaving cam 2 in proper position to complete the run of blanks, and freeing cam 1 so to speak for adjustment to the different angular position required for the length of blank to be cut during the next succeeding run.

Figure 3:
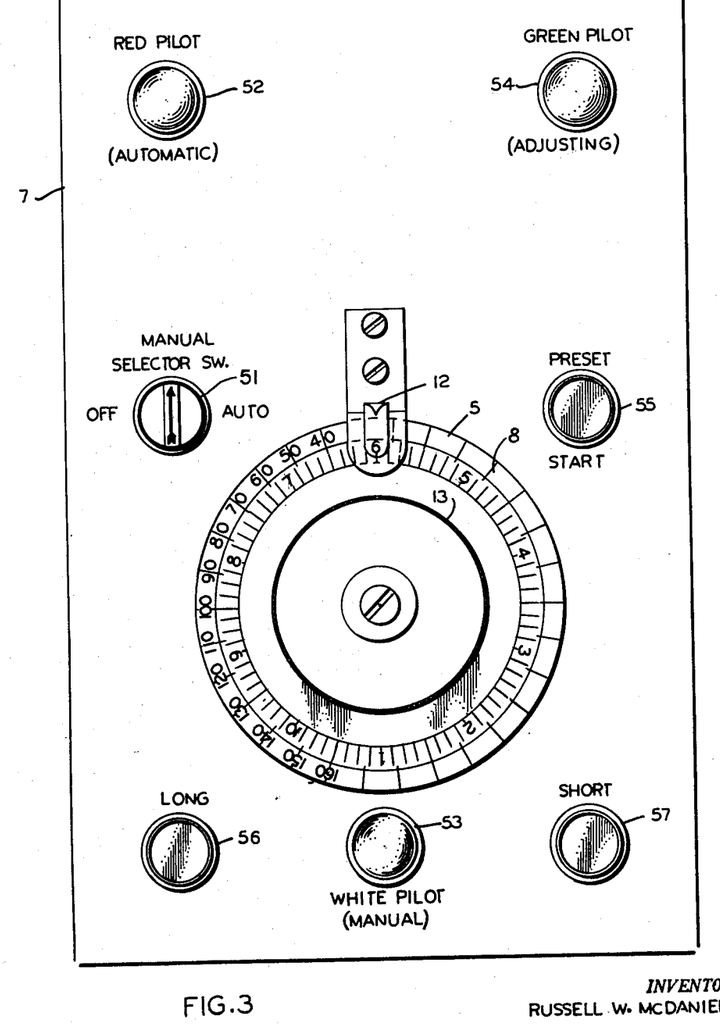

As shown in FIG. 2 the master cam 1 is provided with a hub 3 which is made fast to a collar 4 fixed to a coarse adjusting dial 5, the above parts being mounted for angular movement about a stationary shaft 6 supported in the walls of a housing 7. A fine adjusting dial 8 is preferably used in conjunction with dial 5. In the form shown, a fixed gear 9 is carried by shaft 6 in between the dials 5 and 8, and a pinion 10, journaled in the dial 8, meshes with the fixed gear 9 and a gear 11 carried by dial 5. When dial 5 is turned, it carries the master cam 1 around with it and also the fine adjusting dial 8, the gear 11 having a few more teeth than the gear 9, so that a certain amount of differential movement will take place between the two dials during rotation. As shown in FIG. 3, the dials may be provided with a pointer member 12, the dial 5 being calibrated for example for every 10" of length of cut, and one complete revolution of the dial 8 with respect to dial 5 representing a 10" change in length of cut, with intervening calibrations of ⅛". Thus by turning the dial 5 to the nearest 10" mark which is shorter than the desired length of cut, and then turning the knob 13 of dial 8 until the graduations thereon show the necessary number of additional inches and fractions of an inch, the setting of the master cam 1 to the length desired for the next succeeding run of blanks, may be effected.

The slave cam 2 is shown in FIG. 2 as having a hub 14 which is connected by an angularly adjustable coupling 15, appropriate forms of which are known, to the hub 16 of a sprocket wheel 17 driven in definite relation to the rotary ratio-adjusting shaft of the variable speed transmission G (FIG. 1) which latter may be of known construction and mode of operation, such as the Reeves drive. Thus as the variable speed transmission is adjusted to produce different lengths of cut, the various settings will be reflected in the angular position of slave cam 2.

Figure 4:
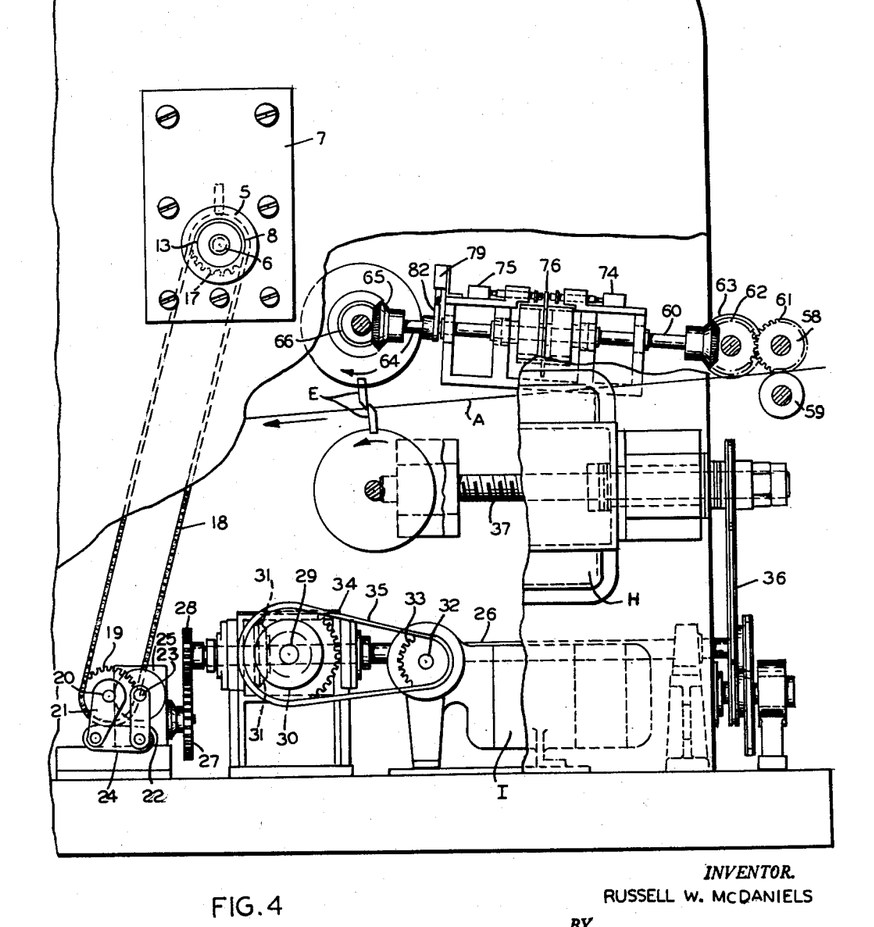
FIG. 4 is a side elevation showing the housing of FIG. 2 in combination with an intermediate train of mechanism which is used in adjusting the length of cut and the cutting speed of the cutoff, the upper part of this view also showing a preferred form of mechanism used to regulate the length of cut more accurately during a run of blanks desired to be identical in length.

FIG. 4 shows a preferred form of driving train for the last above mentioned purposes, but omitting a showing of the variable speed transmission as a whole and also omitting a detailed showing of the mechanism for making compensating adjustments in the cutting speed, since appropriate forms of such mechanisms are known in the art. In FIG. 4 the sprocket wheel 17 is shown as connected by a chain 18 to a sprocket wheel 19 carried by a spindle 20 having fixed thereto a rotary arm 21 which drives a rotary arm 22 carried by spindle 23, through the medium of a link 24 pivotally connected to such arms. The spindle 23 may be understood as part of a gear reduction unit of known form, as indicated at 25, and which is connected to a shaft 26 by gears 27 and 28. The ratio-adjusting shaft of the variable speed transmission is indicated in FIG. 4 at 29, the shaft 26 being shown as driven from shaft 29 by interposed bevel gears 30 and 31. In FIG. 4 the adjusting shaft 29 of the variable speed transmission is shown as driven from the output shaft 32 of reversible adjusting motor I, by means of sprocket wheels 33 and 34 carried respectively by the shafts 32 and 29, and chain 35.

Thus whenever the motor I is energized in one direction or the other to adjust the machine to a longer or shorter length of cut, the position of the slave cam 2 will be proportionately altered by the train of mechanism just described in connection with FIG. 4.

In a machine of the above character the change in angular position of cam 2, in different parts of the range of adjustment, tends to be substantially less than in other parts of the range, unless compensating motion modifying elements are included in the train. The above described arms 21 and 22 with their connecting link 24 are preferably included to render more equal, the amount of angular movement of the cam 2 which will be produced by adjusting the machine to cut to given differences in length of cut, in different parts of the range in length of cut which the machine affords.

The shaft 26 also drives through appropriate gearing including chain 36 (FIG. 4) a screw shaft 37 which should be understood as controlling the cutting speed adjusting mechanism for the cutoff knives, to keep the cutting speed substantially equal to the speed of travel of the web A when the machine is adjusted to cut blanks of different lengths. This cutting speed adjustment is not described in detail since appropriate forms thereof are known in the art.

The master cam 1 controls the operation of the motor I and the consequent setting of the slave cam 2 by means of parts as shown in the upper portion of FIG. 2, along with appropriate electrical circuit arrangements later to be described. In the upper portion of FIG. 2 I have shown a frame 38 which is mounted to slide up and down along a post 39 which is positioned somewhat to the rear of shaft 6 as the parts appear in FIG. 2. This frame carries a pair of normally open microswitches 40 and 41 which however will be temporarily closed when their plungers 42 carrying rollers 43 are alternatively actuated as later described, for the purpose of energizing the motor I in one direction or the other to adjust the machine to cut shorter or longer lengths of cut.

A trigger-like control member 44 is shown in FIG. 2 as pivotally mounted on frame 38 by means of a stud 45, the wings of this member resting respectively upon the peripheries of the cams 1 and 2, so that the elevation assumed by the frame 38 and associated parts carried thereby, is dependent upon the settings of the cams 1 and 2, the arm 46 of member 44 tilting to the right or to the left whenever the cams are in different angular positions. The arm 46 is positioned between the opposite side walls 47 of a fitting 48 which is pivotally mounted on frame 38 by means of a stud 49, this fitting carrying a leaf spring 50 which frictionally engages the frame 38 so as to hold the fitting in whatever angular position it may be moved into by movement of the arm 46, until positively moved into a different angular position by further movement of the arm 46. Whenever the fitting 48 is swung by movement of arm 46 out of the vertical position shown in FIG. 2, it closes one of the microswitches 40 and 41 to adjust the machine to a longer or shorter length of cut, depending on the relative settings of cams 1 and 2.

FIG. 2 shows the position assumed by the parts during a run of blanks of given length, and prior to the time when the dials 5 and 8 have been manipulated to set the master cam 1 to the longer or shorter length desired for the next succeeding run. During this stage and until the current run of blanks is completed, the circuit connections from the microswitches 40 and 41 to the adjusting motor I are broken. Therefore the master cam 1 may be set to the length required for the next succeeding run with no immediate effect upon the length of cut, although this adjustment of cam 1 will cause the trigger member 44 and the fitting 48 to be moved to close one or the other of the microswitches 40 and 41. At the end of the run, circuit to the motor I will be closed, and the active microswitch 40 or 41 will keep the circuit active until the motor has moved the length-of-cut adjusting mechanism to the position required for the next succeeding run. In the meantime cam 2 will have been moved into a position matching cam 1, and the wings of trigger member 44 will assume the horizontal position shown in FIG. 2, thereby opening the switch 40 or 41 which previously had been closed. The above cycle of operation leaves the master cam free for adjustment as required for the next succeeding run, during the progress of the current run and without disturbing the latter.

Various devices, appropriate forms of which are known in the art, may be used for bringing the adjusting motor I more or less abruptly to rest after energizing current thereto is cut off. The arrangements of this character may be such that after current has been cut off which turns the motor for example in the direction to produce shorter blanks, the motor will overrun before coming to rest, until the mechanism reaches a setting which will produce a length of cut somewhat shorter than desired, and entailing supplemental adjustment of the motor in the reverse direction before the final desired adjustment is achieved, whereas when adjustment is to be made for example to produce a longer length of cut, the motor comes to rest more abruptly so as to involve no supplemental movement as above mentioned. In this way the effect of back lash may be alleviated, since final movements of the motor in completing the adjustment may always be in the same direction.

Preferably the circuit arrangements are such that the adjustments to different lengths of cut may be made either automatically or manually as the operator may desire. In other words assuming the dials 5 and 8 have been set to the length desired for the next run, in the automatic type of operation after the current run has been completed, a circuit closer is actuated either manually or for example by a counter mechanism appropriate forms of which are known, which is set to actuate the circuit closer upon the completion of the current run. A microswitch 40 or 41 is then activated as previously described to adjust the machine to the new length of cut desired for the next run. In the manual type of operation the operator closes selectively, manual circuit closers which energize the length adjusting motor in one direction or the other until the desired length of cut has been reached.

FIG. 3 shows a panel board on the housing 7 which is adapted for the above types of operation, including a selector switch 51 which shifts the circuit connections controlling the adjusting motor between "off," "manual" and "automatic" settings. The red pilot light 52 at the upper left of the panel may indicate that the circuits are arranged for automatic operation, while the white pilot light 53 at the bottom of the panel indicates that the circuits are arranged for manual operation. The pilot light 54 at the upper right of the panel may indicate that the operation of adjusting the machine to a different length of cut is in progress, either automatically or manually. In the central portion of FIG. 3 a circuit closer 55 is indicated for initiating the operation of adjusting the machine to a new length of cut, when set for "automatic" operation. Circuit closers 56 and 57 at the bottom of FIG. 3 may be used respectively for adjusting the machine to a longer or shorter length of cut, during "manual" operation.

A preferred form of mechanism for regulating the length of cut during the runs to compensate for irregularities of the character mentioned in the third paragraph of this specification, is shown in FIGS. 4–6. FIG. 4 shows the web A passing to the knives of the cutoff E, and a roller 58 presses against the portion of the web A which is traveling to the cutoff, in such manner as to derive its motion directly from the traveling web and reflect any changes in the speed of feed of the web. As shown, an idler roll 59 underlies the portion of the web against which roller 58 engages.

A shaft 60 is connected to roller 58 by gears 61, 62 and 63, to rotate at a speed proportional to the speed of feed of the web. A second shaft 64 is connected by gears 65 and 66 to rotate at a speed proportional to the rate of rotation of the upper knife of the cutoff E.

As shown in FIG. 5, the shaft 60 carries a one-way clutch mechanism 67 of the overrunning type, which may be of known form having a collar 68, while the shaft 64 carries a similar clutch 69 having a collar 70, the clutches driving in the same direction.

A control member 71, shown in the form of a sleeve slidably overlying the collars 68 and 70, responds to deviations in speed of rotation between the shafts 60 and 64. In the illustrated form the collars 68 and 70 carry drive pins 72 (FIGS. 5 and 6) which engage respectively in oppositely inclined slots 73 in the control member 71. So long as the shafts 60 and 64 are rotating at the same speed, control member 71 remains in a median position with respect to clutches 67 and 69, but should the relative speeds of the shafts change, the faster running shaft will become the driver and cause the clutch on the slower running shaft to overrun, and the pins 72 engaging in the inclined slots 73 will cause the control member 71 to shift to the right or to the left from the position shown in FIG. 5.

Such shift in position is reflected in the circuits controlling the motor I (FIG. 1) which controls the length of cut, it being understood that this last mentioned control is active during a run of blanks to correct inaccuracies in the lengths of blanks desired to be identical in length, during which time the previously described "pre-set" mechanism for adjusting the length of cut for the next run, is inactive. Conversely the length control mechanism shown in FIG. 5 is disconnected from the adjusting motor I between runs, when the previously described "pre-set" mechanism is in operation.

As shown in FIG. 5, the accuracy control mechanism is provided with microswitches 74 and 75 which should be understood as so coordinated in the electrical circuits leading to the adjusting motor I that one of these switches energizes the motor in one direction to provide a longer length of cut, while the other energizes the motor in the reverse direction to produce a shorter length of cut. The control member 71 is shown as provided with an annular flange 76 which is interposed between the rollers 77 of spring compressed plungers 78 which activate the switches 74 and 75 for the above purposes.

The accuracy control mechanism is also shown in FIG. 5 as provided with a further microswitch 79 having an actuating plunger 80 provided with a roller 81 which engages a cam 82 carried by shaft 64 driven in synchronism with the knives of cutoff E. The cam 82 is so coordinated that the switch 79 closes only during the cutting phase of the cutoff knives, when their speed of travel should be equal to the speed of travel of web A. In other phases of their cycle, the rotary speed of the knives will usually be greater or less than when cutting, as needed to secure different lengths of cut without variation of the cutting speed in different settings, and accordingly the switch 79 is included in the circuits leading to the switches 74 and 75 in such manner that one or the other of these latter will activate the adjusting motor I in a pulsating manner only during the successive cutting phases of the knives, and under conditions where a difference between the cutting speed of the knives and the speed of feed of the web, has caused the control member 71 to activate one or the other of the switches 74 and 75 during a cutting phase. The adjustments in length of cut as affected by the last above described mechanism, will usually be very minor as compared to those effected by the "preset" mechanism above described.

Referring now to the electrical circuit diagram of FIG. 7, the components thereof previously discussed with reference to FIGS. 1–5 inc., are similarly designated. The adjusting motor I is of the three-phase alternating current induction type, energized over leads 90–92, inc., and through normally open contacts L–1 and S–1 of relays L and S, from a three-phase source supplied over input leads 93–95 inc. Leads 90 and 92 contain overload relays O and M. It will be observed that when contacts L–1 of relay L are closed, the order of phase rotation supplied from leads 93–95, inc. to leads 90–92, inc., is in the opposite direction to that supplied when contacts S–1 of relay S are closed, thereby to energize the motor I in one direction of rotation or the reverse depending on the energization of relay L or S. The connections are such that energization of relay L actuates the motor I to adjust the drives G and H, FIG. 1, to increase the length of cut of the web A, whereas energization of relay S actuates the motor in the reverse direction to provide adjustments which decrease the length of cut.

Power for energizing the control circuits is tapped off from one of the input phases 94, 95, over leads 96, 97, and a portion passed through the primary winding 98 of a step down transformer 99, bridged between these leads and having a secondary winding 100, for energizing the pilot lamps 52–54, inc., in the manner explained below.

Figure 7:
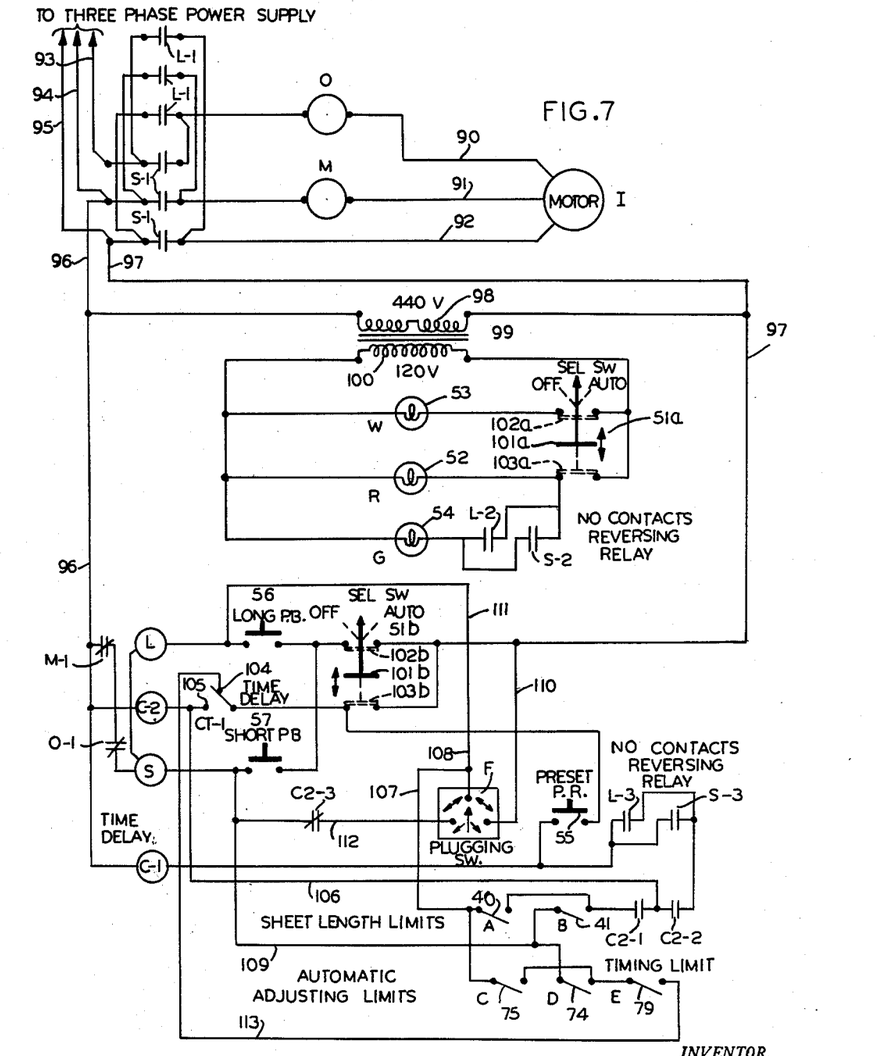
FIG. 7 is a diagram showing schematically, an electrical circuit arrangement appropriate for use in connection with the "pre-set" mechanism, and the mechanism for regulating the length of cut during a run.

As above stated, on the control panel, FIG. 3, there is a three position selector switch 51 having "off," "manual" and "automatic" positions, and there are three momentary contact push buttons, two 56 and 57 for the manual circuits, marked "long" and "short" respectively, and one 55, marked "preset" which starts the preset in motion, these switches also being so designated in FIG. 7.

Referring to FIG. 7, the selector switch 51 has duplicate sets of contacts, one set 51a for controlling the pilot lamps 52–54 and another set 51b for controlling the switching circuits of the adjusting motor I. When this switch is set on "manual," its contact arms 101a and b, bridge the upper fixed contacts as at 102a and b; and when on automatic, the lower fixed contacts, as at 103a and b.

In the "manual" setting, the white pilot lamp 53 is energized from the transformer secondary 100, through the upper switch contacts 102a; and also a connection is established through the upper switch contacts 102b, for selectively energizing the "long" and "short" relays L and S under control of the "long" and "short" push buttons 56 and 57. Thus if button 56 is depressed, the L relay is energized over the circuit traced from power lead 97, through the selector switch contacts 102b, thence through the contacts of push button 56, and through the L relay winding, and in series through normally closed contacts O–1 and M–1 of the overload relays O and M to the opposite power lead 96. Relay L will thus operate to close its contacts L–1 and thereby energize motor I from power input leads 93–95 in the "long" direction, i.e., in the direction to increase the length of cut. Relay L will remain energized so long as the push button 56 is depressed, to adjust the cutting length in the "long" direction to the extent desired. Conversely depression of push button 57, energizes the S relay, over the circuit above traced except for now passing through the contacts of push button 57 and the winding of the S relay. Energization of relay S closes its contacts S–1 to connect power from leads 93–95 to motor I, in the reverse direction of phase rotation to that above stated, so that motor I is energized to rotate in the opposite or "short" direction of sheet length adjustment, this adjustment continuing so long as push button 57 is depressed.

When the selector switch 51 is in the automatic position, it completes a circuit through its contacts 103a to energize the red pilot lamp 52, from the transformer secondary 100, to indicate that the circuit is set for automatic operation. It also completes a connection through its contacts 103b, from power lead 97 to the right hand contact of the preset switch 55. When now the preset switch is depressed, a circuit is completed through its contacts from power lead 97 as above traced through the winding of a time delay relay CT to the opposite power lead 96, thus to energize the relay. The CT relay has a contact arm CT–1 which normally rests against a back contact 104, but when the relay is energized, the arm is actuated against a front contact 105. This relay is also provided with a timer mechanism such that upon actuation, it will automatically release after a preselected interval after it is deenergized and for purposes explained below.

Operation of the CT relay upon depression of the preset switch in the manner above explained, to actuate its contact arm CT–1 against it front contact 105, will complete a circuit to energize a relay C2, this circuit being traced from power lead 97 through contacts 103b of the selector switch and thence through the contact arm CT–1 and front contact 105 of relay CT and through the winding of the C2 relay to the opposite power lead 96. The C2 relay as thus energized, closes its normally open contacts C2–1 and C2–2. Closure of the C2–1 contacts connects the power lead 97 through to the fixed contacts of the preset selector microswitches 40 and 41 over a circuit traced through contacts 103b of switch 51b, contacts CT–1 and 105 of relay CT and thence over lead 106 and through contacts C2–1. The movable contact of switch 40 is connected over leads 107, 108 to the winding of the L relay; while the movable contact of switch 41 is connected over lead 109 to the S relay. Accordingly, depending on the actuation of the microswitches 40, 41 at the time the preset push button 55 is depressed, the adjusting motor I will be energized in one direction of rotation or the other until the slave cam 2 of FIG. 2 has been adjusted in conformity with the preset position of cam 1, and the trigger arm 46 thereby adjusted to its median position to open the contacts of both of the microswitches 40, 41.

During intervals that the adjusting motor is energized in the manner aforesaid under control of relays L or S, the green pilot lamp 54 will be lit by energization from the transformer secondary via contacts L–2 or S–2 of the L and S relays, respectively which contacts are wired in multiple, and although normally open are closed by energization of these relays, respectively.

The C2–2 contacts of the C2 relay provide a holding circuit for the CT relay so long as either of the motor adjusting relays L and S is energized. This circuit is traced from the left power lead 96 through the CT relay winding and thence through normally open contacts L–3 and S–3 connected in multiple of the L and S relays, respectively, and thence in series through contacts C2–2 and C2–1 of the C2 relay to the fixed contacts of the microswitches 40, 41. Thus the CT relay will remain energized to actuate the C2 relay until the preset adjustment is completed and the contacts of both microswitches 40 and 41 are open and both the L and S relays released, whereupon after an interval the CT relay will release in turn to release the C2 relay.

As above stated, the adjusting motor I is provided with a plugging switch F of conventional design which brings the motor to an abrupt halt without overrunning on release of either of the sheet length control relays L or S after energization thereof to drive the motor in one direction or the other. The control contacts of the plugging switch are connected over leads 110, 111 and 112 to the power lead 97 and to the L and S relays, respectively.

Lead 112 extends through normally closed contacts C2–3 of the C2 relay, so that when the relay is energized it opens the circuit to the plugging switch in the short sheet adjusting direction, thereby allowing the adjusting motor to drift enough to overrun past the sheet length desired in this direction until it trips the microswitch 40 on the long sheet length side. This effects a uni-directional adjustment at all times, which eliminates back lash, lost motion and directional discrepancies that could otherwise occur.

After the present adjustment has been made, the holding circuit for the CT relay is opened at the L–3 and S–3 contacts by release of the L and S relays, following which the CT relay will release after a preset period of time to actuate its contact arm CT–1 against its back contact 104. This releases the C2 relay and connects the power lead 97 through contacts 103b of the selector switch and through contacts CT–1, 104 of the CT relay and thence over lead 113 to fixed contact of microswitch 79 of the sheet length accuracy controller, which thereupon takes over control of the adjusting motor I via the microswitches 74 and 75. To this end the movable contact of switch 79 is wired to the fixed contacts of switches 74 and 75, the movable arms of which latter are connected respectively over leads 109 and 107, 108, to the windings of the S and L relays, respectively. Actuation of these switches in the manner above described with reference to FIGS. 5 and 6 thereafter provides automatic adjustment of the sheet length.

I claim:

1. A cutoff or like machine of the character described having a cyclically driven and periodically operating tool member, means for progressively feeding material past said tool member to be operated upon thereby, reversible means for adjusting the periodicity of operation of said tool member, a cam member, means coupling said cam member to said periodicity adjusting means to alter the position of said cam member according to the setting of said periodicity adjusting means, a second cam member juxtaposed and adjustable with respect to said first mentioned cam member, a control member mounted for movement in two directions, means mounting said control member in engagement at substantially all times with both said cam members to automatically move said control member to different positions and in either of said directions responsive to movement of one of said cam members relative to the other, and means controlled by the position of said control member for activating said periodicity adjustment means toward either of its directions of reversible movement to alter the periodicity of operation of said tool member.

2. A cut-off or like machine according to claim 1 wherein said reversible means for adjusting the periodicity of operation of said tool member comprises a control motor having a plugging switch for abruptly halting the same, and wherein said means controlled by the position of said control member for activating said periodicity adjustment means comprises an electric circuit including switch means operable upon movement of said motor in one of its said directions of reversible movement to effect a bypass of said plugging switch, and switch means for effecting a reversal of the direction of movement of said motor when said plugging switch is so bypassed, whereby said plugging switch is activated only upon movement of said motor in the other of its said directions of reversible movement.

3. A cutoff or like machine of the character described having a cyclically driven and periodically operating tool member, means for progressively feeding material past said tool member to be operated upon thereby, means for adjusting the periodicity of operation of said tool member, a cam member, means coupling said cam member to said periodicity adjusting means to alter the position of said cam member according to the setting of said periodicity adjusting means, a second cam member, means mounting said second cam member for adjustment to different positions respectively correlated with different periodicities of operation of said tool member, said cam members being juxtaposed in position, a frame member having means mounting same for movement toward and from said cam members, a control member, means mounting said control member on said frame member for movement in two directions and in engagement at substantially all times with both said cam members to automatically move said control member to different positions and in either of said directions responsive to movement of one of said cam members relative to the other, and means controlled by the position of said control member for activating said periodicity adjusting means toward either of its directions of reversible movement to alter the periodicity of operation of said tool member.

4. A cutoff or like machine according to claim 3 wherein said means controlled by the position of said control member comprises a pair of switches carried by said frame member and disposed for respective, alternate engagement by said control member responsive to said movement of the control member in either of said two directions.

5. A cutoff or like machine according to claim 4 wherein said control member is mounted for pivotal movement on said frame member, said juxtaposed cam members being spaced apart, and the axis of said pivotal movement of the control member being located between said cam members, said control member comprising first arm means engaging said cam members and additional arm means for alternately engaging either of said switches responsive to said pivotal movement of the control member.

6. A cutoff or like machine according to claim 5 wherein said first arm means comprises a pair of arm portions projecting outwardly at either side of, and substantially within the plane of, said axis of pivotal movement of the control member, and said additional arm means comprises a single arm portion projecting at right angles to said pair of arm portions, each of said pair of switches being disposed at opposite sides of said single arm means.

7. A cutoff of the character described having continuously driven rotary cutting knives, variable speed transmission mechanism for adjusting a period of rotation of said knives, cutting speed adjusting mechanism for said knives, a reversible motor connected to said mechanisms for adjusting the same, means for progressively feeding material past said knives to be cut thereby, juxtaposed cam members, one of which is provided with means coupling the same to said motor to alter the position of such cam member according to the setting of said variable transmission mechanism, and another of which cam member is provided with means for adjustment to different positions respectively correlated with different settings of said variable speed transmission mechanism, a control member mounted for movement in two directions, means mounting said control member in engagement at substantially all times with both said cam members to automatically move said control member to different positions and in either of said directions responsive to movement of one of said cam members relative to the other, and electrical circuit means controlled by the position of said control member to activate said motor toward either of its directions of reversible movement to adjust said variable speed transmission to different setting according to the relative positions of said cam members, said reversible motor being operable during said adjustment of said other cam member.

8. A cutoff or like machine of the character described having a cyclically driven and periodically operating tool member, means for driving said tool member and for progressively feeding material past said tool member to be operated upon thereby, means interposed between said drive means and tool member for adjusting the periodicity of operation of said tool member, means operable upon the conclusion of a run for activating said periodicity adjusting means to cause said tool member to operate at a different periodicity, said means being disconnected from said periodicity adjusting means during the run, and means in driven relation to said tool member and to the material being fed to said tool member and connected to said periodicity adjusting means during the run, for activating said periodicity adjusting means during the run to compensate for deviations between the speed of feed of said material to said tool member and the periodicity of operation of said tool member, said last mentioned means being disconnected from said periodicity adjusting means between runs.

References Cited in the file of this patent
UNITED STATES PATENTS

| | | |
|---|---|---|
| 1,913,153 | De Salardi | June 6, 1933 |
| 2,187,091 | Morgan | Jan. 16, 1940 |
| 2,233,490 | Shields | Mar. 4, 1941 |
| 2,250,209 | Shoults | July 22, 1941 |
| 2,389,341 | Behrens | Nov. 20, 1945 |
| 2,586,462 | Forster | Feb. 19, 1952 |
| 2,599,430 | Bauerman | June 3, 1952 |
| 2,634,811 | Schaelchlin | Apr. 14, 1953 |
| 2,802,431 | Hoagland | Aug. 13, 1957 |
| 3,029,675 | Alexander | Apr. 17, 1962 |